US008991927B2

(12) United States Patent
Wisniewski et al.

(10) Patent No.: US 8,991,927 B2
(45) Date of Patent: Mar. 31, 2015

(54) HOLDER FOR HEADREST

(71) Applicants: David Wisniewski, Russels Point, OH (US); Masato Miyaguchi, Farmington Hills, MI (US); Hisayuki Yoshizawa, Farmington Hills, MI (US)

(72) Inventors: David Wisniewski, Russels Point, OH (US); Masato Miyaguchi, Farmington Hills, MI (US); Hisayuki Yoshizawa, Farmington Hills, MI (US)

(73) Assignees: World Class Plastics, Inc., Russels Point, OH (US); Tachi-S Engineering USA, Inc., Farmington Hills, MI (US)

( * ) Notice: Subject to any disclaimer, the term of this patent is extended or adjusted under 35 U.S.C. 154(b) by 36 days.

(21) Appl. No.: 13/685,159

(22) Filed: Nov. 26, 2012

(65) Prior Publication Data

US 2014/0145486 A1    May 29, 2014

(51) Int. Cl.
*A47C 1/036* (2006.01)
*B60N 2/48* (2006.01)

(52) U.S. Cl.
CPC ....... *B60N 2/4808* (2013.01); *B60N 2002/4897* (2013.01)
USPC .......................................... 297/410; 297/391

(58) Field of Classification Search
USPC ................................................ 297/391, 410
See application file for complete search history.

(56) References Cited

U.S. PATENT DOCUMENTS 7,370,915 B2 *  5/2008  Droche ...................... 297/463.1
7,434,886 B2 * 10/2008  Yamada ........................ 297/410

FOREIGN PATENT DOCUMENTS

JP    11-89665     4/1999
JP    3475320      9/2003

* cited by examiner

*Primary Examiner* — Sarah B McPartlin
(74) *Attorney, Agent, or Firm* — Ostrolenk Faber LLP

(57) ABSTRACT

A headrest holder includes two tension pieces defined in the body portion thereof and a head portion. The two tension pieces, each including a protrudent portion, are spaced apart from each other along the longitudinal direction of that body portion, while being in a mutually facing relation, so that a headrest stay inserted in the headrest holder is retained between the two protrudent portions against wobbling. Further, those two tension pieces and either the head portion or a support bracket of seat frame establish three supportive points. Namely, the headrest holder inserted in the support bracket is retained against wobbling because the two protrudent portions and the headrest holder's neck portion closely contact the support bracket. Also, a headrest stay inserted in the headrest holder is retained against wobbling because the two protrudent portions and headrest holder's head portion closely contact the headrest stay.

10 Claims, 5 Drawing Sheets

HOLDER FOR HEADREST

BACKGROUND OF THE INVENTION

1. Field of the Invention

The present invention relates to a holder for supporting a headrest, or the so-called "headrest holder", by means of which the headrest is supportively mounted on a top of seat back of automotive seat, the holder itself being able to be supported on an upper region of seat back frame and being so configured to allow a stay of the headrest (or headrest stay) to be inserted and retained therein for the purpose of securing the headrest in position upon the seat back. In particular, the invention is directed to the headrest holder of this kind which effectively prevents wobbling and rattling of a headrest stay therein as well as of the headrest holder itself in a support bracket fixed to the upper region of seat back frame.

2. Description of Prior Art

In general, a headrest holder stated above comprises a head portion and a cylindrical body portion extending from the head portion, the cylindrical body portion being adapted to permit a stay of headrest to be inserted and retained therein.

As one of the hitherto problems found in the headrest holder, the headrest stay, even when securely retained in the headrest holder, is prone to wobbling and rattling due to a clearance between the outer surface of the headrest stay and the inner surface of the headrest holder. Likewise, the headrest holder per se, even when securely fitted in a support bracket fixed to a seat back frame, is prone to wobbling and rattling due to a clearance between the outer surface of, the headrest holder and the inner surface of the support bracket.

Solution to this problem is for example found from the Japanese Laid-Open Patent Publication No. 11-89665 (or JP 11-89665 A) which discloses a headrest holder having resilient tension pieces defined in the cylindrical body portion thereof, wherein the tension pieces are each so configured to resiliently provide a pressure in a direction inwardly of the cylindrical body portion. According to the JP 11-89665 A, a first pair of the tension pieces and a second pair of the tension pieces are formed in the cylindrical body portion in an opposedly facing fashion at a same level. Hence, when the headrest stay is inserted in the cylindrical body portion of such holder, those first and second pairs of tensions pieces contact and press on both two opposite surfaces of the headrest stay, thereby applying a pressure thereto, so that the headrest stay is retained therebetween. More specifically, each of the tension pieces is formed with a projected region in the inner surface thereof and also formed in the outer surface thereof with a recessed region at a point corresponding to that projected region. The projected region is of a substantially arcuate shape in cross-section and projects inwardly from the inner surface of the headrest holder towards an axial center of the headrest holder. On the other hand, the recessed region, opposite to the projected region, has two sharply pointed projections that project outwardly from the outer surface of the headrest holder.

The thus-formed headrest holder is first fitted in a support bracket fixed to a seat back frame, prior to the headrest stay being inserted in the holder. Then, when the headrest stay is inserted in that headrest holder, the outer surface of the headrest stay presses all the afore-said projected regions of the tension pieces, while simultaneously all the afore-said two sharply pointed projections of the recessed regions of the tension pieces are brought to pressed contact with the inner surface of the support bracket. Under such state, all the tension pieces act to apply a pressure to both of the headrest stay and support bracket, so that the headrest stay is retained in the holder, while the headrest holder retained in the support bracket as well. Ostensibly, this arrangement provides a prevention of the above-stated wobbling and rattling of headrest stay and headrest holder.

But, in such prior art, all the tension pieces are disposed collectively at a same level in one localized area of the body portion of the headrest holder. As a result thereof, when a headrest stay has been inserted in that holder, a pressure is applied from the tension pieces intensively to one localized area of the headrest stay, which may result in the headrest stay being inclinable relative to the tension pieces within the inner bore of the headrest holder's body portion, because the tension pieces as a whole only provide one support point to the headrest stay. Consequently, it is highly possible that the headrest stay will be wobbled and rattled in the headrest holder. Further, the configuration of each of the tension pieces, i.e. the arcuately projected and recessed regions defined in the tension piece, is extremely complicated, which requires a high expertise of forming the headrest holder and further increases costs involved. Of course, the first pair of tension pieces and the second pair of tension pieces may be arranged in the upper and lower areas of the holder's cylindrical body portion, respectively, in an attempt to positively prevent wobbling and rattling of the headrest stay in the holder, but forming such configuration of headrest holder will make its structural design more complicated and also will require increased forming costs as well as careful technical skills.

SUMMARY OF THE INVENTION

In view of the above-stated drawbacks, it is a primary purpose of the present invention to provide an improved holder for supporting a headrest on an automobile seat back, which is greatly simplified in structure and insures to not only prevent wobbling and rattling of a headrest stay in the headrest holder, but also prevent wobbling and rattling of the headrest holder itself in a support bracket fixed to a seat back frame provided in the seat back.

In order to achieve such purpose, a headrest holder in accordance with the present invention is basically comprised of;

a head portion having a hole defined therein;

a body portion extending continuously from the head portion, the body portion including: a wall; a through-bore defined inside of the wall, and a lower end region opposite to the head portion, wherein the through-bore is substantially equal in diameter to the hole of the head portion and communicates therewith;

the through-bore and hole being both so configured as to allow insertion of the stay of headrest therein;

the body portion of the headrest holder being so formed as to be inserted and supported in the support bracket;

a first tension piece integrally defined in one surface of the wall of the body portion so as to be resiliently bendable outwardly and inwardly relative to the wall, the first tension piece including, formed therein, a protrudent portion which projects from the afore-said one surface of the wall, wherein said first tension piece is adapted to apply a pressure to both of the headrest stay and support bracket when the headrest holder is inserted in the support bracket, while the headrest stay is inserted and placed in the hole of the head portion as well as in the through-bore of the body portion; and a second tension piece integrally defined in another side of the wall opposite to the one side of the wall so as to be resiliently bendable outwardly and inwardly relative to the afore-said another side of the wall, the second tension piece including, formed therein, a protrudent portion which projects from the afore-said another side of the wall, wherein said second tension piece is adapted to apply a pressure to both of the headrest stay and support bracket when the headrest holder is inserted the support bracket, while the headrest stay is inserted and placed in the hole of the head portion as well as in the through-bore of the body portion, wherein the first and second pieces are disposed so as to be distant from each other along the longitudinal direction of the body portion.

As one aspect of the present invention, both two protrudent portions respectively of the first and second tension pieces may be so formed to project inwardly into the through-bore of the body portion. Or, alternatively, those two protrudent portions may be so formed to project in a direction outwardly of the body portion.

As another aspect of the invention, each of the first and second tension pieces may be formed in a substantially "U" shape so as to extend along the longitudinal direction of the body portion and have: a base region which is only integral with the wall of the body portion; a free end region opposite to the base region; and a substantially U-shaped slit extending along a contour of the thus-formed substantially U-shaped tension piece, so that the first tension piece is bendable relative to the base region in a direction inwardly and outwardly of the wall of the body portion.

As yet another aspect of the invention, each of the first and second tension pieces may be formed in a selected one of substantially trapezoidal and inverted-trapezoidal shapes so as to extend along the longitudinal direction of the body portion and have: a base region which is only integral with the wall of the body portion; a free end region opposite to the base region; and a selected one of substantially trapezoidal and inverted-trapezoidal slits extending along a corresponding contour of the tension piece. With such configuration, a degree of resilient bendability of each tension piece can be adjusted as required.

Other various features and advantages will become apparent from reading of the description, hereinafter, with reference to the accompanied drawings.

DETAILED DESCRIPTION OF PREFERRED EMBODIMENT OF THE INVENTION

Referring at first to FIGS. 1 to 8, there is illustrated a first preferred mode of headrest holder in accordance with the present invention, the headrest holder itself being generally designated by 5. Designations SB and 3 denote a known seat back of an automobile seat and a known headrest, respectively, which are applied to the headrest holder 5 of the present invention, as will be described in details later.

Figure 1:
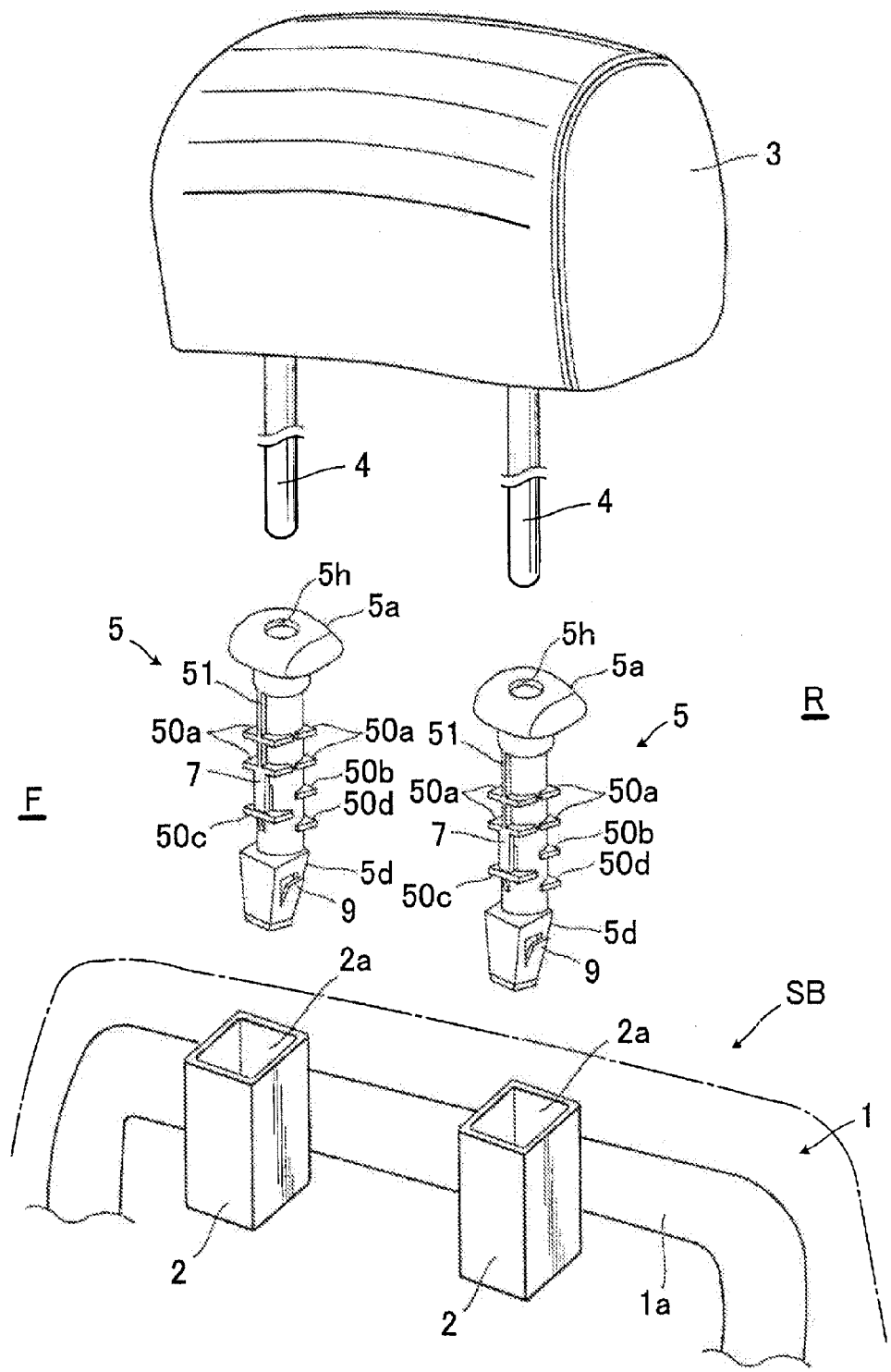
FIG. 1 is an exploded perspective view showing a headrest, a support bracket provided in a seat back, and a headrest holder of the present invention which is to be applied to the headrest and support bracket.

As seen in FIG. 1, the seat back SB includes a seat back frame 1 provided therein, and an upper cross frame 1a is integrally defined in that seat back frame 1 adjacent to a top of the seat back SB. Firmly welded to the upper cross frame 1a are a pair of substantially rectangular support brackets 2 and 2, each having a rectangular hole 2a defined therein. As will be described, each support bracket 2 is adapted for supporting the headrest holder 5 therein.

The headrest 3 has a pair of columnar stays 4 and 4 (hereinafter, each of them shall be referred to as "headrest stay 4"), which extend vertically from the bottom side thereof, as well known in the art.

In the illustrative embodiment, therefore, a pair of headrest holders 5 and 5 are provided to retain therein the afore-said two headrest stays 4 and 4, respectively, in conjunction with the two support brackets 2 and 2.

Hereinafter, note that the wording, "forward", "front" or "forwardly", refers to a forward side F that faces forwardly of the seat back SB, whereas the wording "rearward", "rear" or "rearwardly" refers to a rearward side R that faces rearwardly of the seat back SB.

Now, a detailed description will be made of the headrest holder 5 of the present invention. The headrest holder 5 itself is formed from a synthetic resin material, such as polypropylene, and basically comprised of: a head portion 5a; a stopper flange portion 5b defined in the neck portion thereat a cylindrical body portion 5c; a lower end portion 5d having a pair of lower lock pieces 9 and 9; and a through-bore 6 extending in and through those body and lower end portions 5c and 5d, excepting the head portion 5a, and being so formed to allow one of the two headrest stays 4 to be inserted and retained therein.

The head portion 5a is large in dimensions relative to the cylindrical body portion 5c and lower end portion 5d, and has an inner hollow area 5a-1 in which a known lock device 10 (indicated by the dotted line in FIG. 5) may be provided as required for the purpose of locking and unlocking the headrest stay 4 to and from the headrest holder 5. Designation 5h denotes a hole formed substantially centrally in the top of the head portion 5a. The hole 5h is equal in diameter to the through-bore 6 and communicates therewith via the hollow area 5a-1. Designation 5h-1 denotes an inner edge of that hole 5h.

The stopper flange portion 5b may be formed as an outwardly projected rectangular flange integral with the cylindrical body portion 5c. As best understandable from FIG. 5, such stopper flange portion 5b is shown to be fitted in a recessed or stepped region defined in the upper end of the rectangular support bracket 2, thereby preventing the headrest holder 5 against downward removal from that bracket 2.

The cylindrical body portion 5c has, defined inside thereof, the foregoing through-bore 6 which is of a diameter slightly larger than the outer diameter of the headrest stay 4, so as to allow sliding insertion of the headrest stay 4 therein.

Formed integrally with the circular outer surface of the cylindrical body portion 5c are triangular fins 50a, 50b, 50c and 50d, each projecting outwardly and horizontally therefrom and terminating in an apex at which the interior angle thereof is a right angle. Note that all those triangular fins are identical in size to one another. Specifically, referring to FIGS. 1 and 3, as viewed from the upper side of the body portion 5c downwardly, defined integrally in that cylindrical body portion 5c are: a first set of four triangular fins 50a, a second set of four triangular fins 50a, a first pair of rear triangular fins 50b, a pair of front triangular fins 50c, and a second pair of rear triangular fins 50d, wherein the provision of the rear triangular fins 50d are not completely viewed, but can be recognized by taking a comparative look at FIGS. 1 to 3. Each of the first and second sets of four triangular fins 50a is arranged such that all the four fins 50a project outwardly from one and the same point in the outer surface of the cylindrical body portion 5c, whereupon a whole of those four fins 50a takes on the form of one square or rectangular fin that expands horizontally from the cylindrical body portion 5c in all angles. On the other hand, it is to be understood that the first pair of rear triangular fins 50b, the pair of front triangular fins 50c and the second pair of rear triangular fins 50d cooperate with one another to serve as, a square or rectangular fin about the cylindrical body portion 5c, such square or rectangular fin being equal in outer size to the earlier stated square or rectangular fin assumed by each of the first and second sets of four fins 50a and 50a. Hence, it is to be seen that all those fins 50a to 50d in the aggregate establish a plurality of rectangular projections of a uniform size about the cylindrical body portion 5c. Note that the outer size of such uniformly arranged rectangular projections substantially correspond to or are slightly smaller than the inner size of the rectangular hole 2a of the support bracket 2. This configuration therefore allows the cylindrical body portion 5c to be smoothly inserted and supported in the rectangular hole 2a of support bracket 2 in a stable manner.

Figure 2:
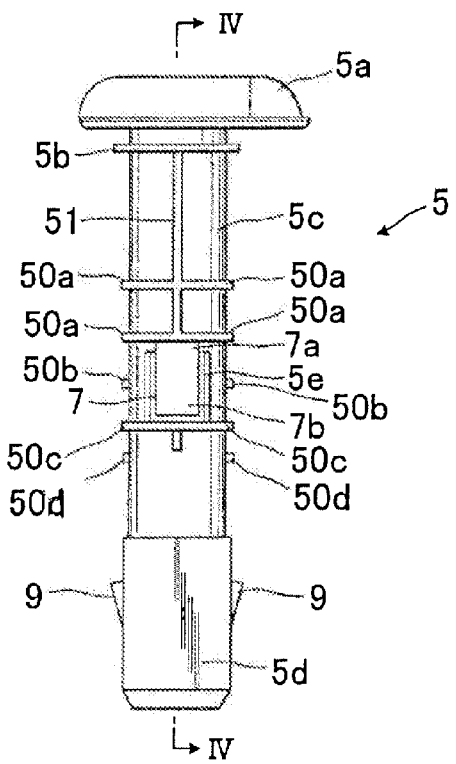
FIG. 2 is a front view of the headrest holder.
Figure 3:
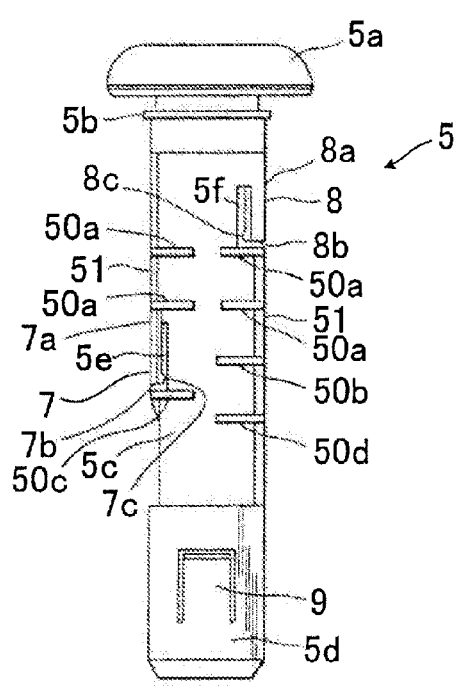
FIG. 3 is a side view of the headrest holder.
Figure 4:
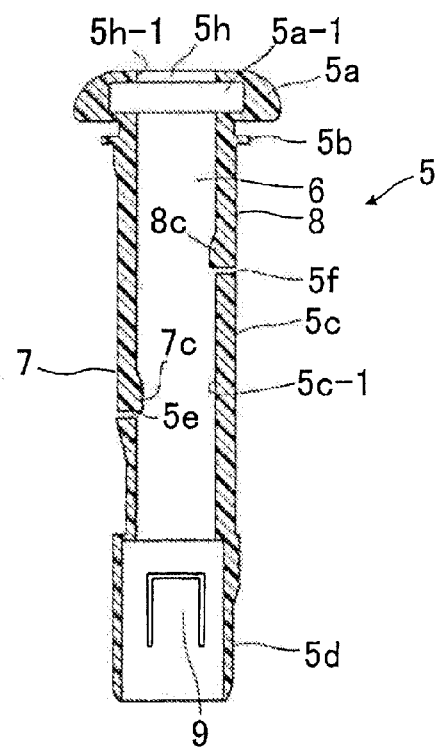
FIG. 4 is a longitudinally sectional view taken along the line IV-IV in the FIG. 2.

Designations 51 and 51 denote front and rear reinforcing ribs, respectively, which are defined integrally in the opposite surfaces (i.e. the front and rear sides) of the cylindrical body portion 5c and extend along the longitudinal direction of that body portion 5c. As can be seen in FIGS. 2 to 4, those two reinforcing ribs 51 are integral and flash with each of the afore-said fins 50a, 50b, 50c and 50d and extend across all those fins, thereby protecting all the fins against deformation in the case of an excessive great load being applied thereto in forward and rearward directions.

The lower end portion 5d is formed substantially rectangular so as to be tapered gently downwardly in a direction to the end thereof, while the upper end thereof is stepped out from the cylindrical body portion 5c to a point aligned with the outer edges of the fins 50a to 50d. Thus, such upper end of the lower end portion 5d has a rectangular size slightly smaller than the inner rectangular size of the support bracket's thorough-hole 2a.

Accordingly, when inserting the cylindrical body portion 5c of the headrest holder 5 in the rectangular support bracket 2, all aligned outer edges of the fins 50a to 50d and of the lower end portion 5d neatly slide along and snugly contact the inner rectangular surfaces 2a-1 of the support bracket 2, so that the cylindrical body portion 5c can be smoothly inserted and stably supported in the rectangular support bracket 2.

Designations 9 and 9 denote a pair of opposedly facing lock pieces integrally formed in the lower end portion 5d so as to resiliently project outwardly therefrom. The two lock pieces 9 and 9 are adapted to engage the lower end of the support bracket 2, when inserting the headrest holder 5 in the support bracket's hole 2a, to thereby lock and retain the headrest holder 5 in the bracket 2 against upward removal therefrom, which can be best, seen in FIG. 5.

Based upon the above-formed configuration of headrest holder 5, in accordance with the present invention, one first tension piece 7 and one second tension piece 8 are integrally defined in the wall of the cylindrical body portion 5c so as to be distant from each other along the longitudinal direction of the headrest holder 5, while being in an opposedly facing relation with each other. Each of the two tension pieces 7 and 8 is resiliently bendable in a direction outwardly and inwardly of the cylindrical body portion 5c for purposes to be set forth later.

In accordance with the present invention, as shown, the first tension piece 7 is disposed substantially near to the headrest holder's lower end portion 5d, whereas the second tension piece 8 disposed at substantially a middle point between the first tension piece 7 and the headrest holder's head portion 5a. As such, the first and second tension pieces 7 and 8 are not disposed on the same level and not located near to each other, either, in the cylindrical body portion 5c, but spaced apart from each other an appreciable distance along the longitudinal direction of the cylindrical body portion 5c. Particularly, in accordance with the present invention, the head portion 5a, the first tension piece 7 and the second tension piece 8 are spaced apart distantly from one another, which is an important factor of the present invention, as will be discussed later.

More specifically, as seen in FIGS. 2 and 3, the first tension piece 7 is disposed at a predetermined point in the cylindrical boy portion 5c, such predetermined point being defined lower than and remote from the second tension piece 8, while being defined above and remote from the lower end portion 5c. The illustrated first tension piece 7 per se is simply formed as one unitary tongue having a substantially U-shaped contour and extending along the longitudinal direction of the cylindrical body portion 5c, with a substantially U-shaped slit 5e defined along that contour of the first tension piece 7. Therefore, the first tension piece 7 has a base region 7a that is only integral with that body portion 5c. From that base region 7a thereof, the tension piece 7 per se extends in a direction to the end portion 5d and terminates in a free end region 7b. With this configuration, the first tension piece 7 is resiliently bendable and/or deformable relative to the base region 7a thereof, independently of the cylindrical body portion 5c. As best seen in FIGS. 3 and 4, formed integrally in the inner surface of the free end region 7b is a protrudent portion 7c that projects inwardly therefrom into the inside of the cylindrical body portion 5c to a predetermined extent.

As far as the shown embodiment is concerned, the first tension piece 7 is raised outwards from the outer surface of the body portion 5c to the extent that the outer surface thereof lies flush with the outer edges of the two front triangular fins 50a as well as of the front reinforcing rib 51. This insures that the outer surface of the first tension piece 7 is bendable and displaceable outwards directly from a plane of both front fins 50a and rib 51.

On the other hand, the second tension piece 8 is substantially of the same configuration as the foregoing first tension piece 7, but disposed at a predetermined point which is above and remote from the first tension piece 7, while being lower than and remote from the head portion 5a. The illustrated second tension piece 8 is formed as one unitary tongue having a substantially U-shaped contour and extending along the longitudinal direction of the cylindrical body portion 5c, with a substantially U-shaped slit 5f defined along that contour of the second tension piece 8. Hence, the second tension piece 8 has a base region 8a that is only integral with the body portion 5c, and, from that base region 8a, the second tension piece 8 per se extends in a direction to the end portion 5d and terminates in a free end region 8b. Accordingly, the second tension piece 8 is resiliently bendable and/or deformable relative to the base region 8a thereof, independently of the cylindrical body portion 5c. As seen in FIGS. 3 and 4, formed integrally in the inner surface of that free end region 8b is a protrudent portion 8c that projects inwardly therefrom into the inside of the cylindrical body portion 5c to a predetermined extent. Also, in the shown embodiment, as similar to the first tension piece 7, the second tension piece 8 is raised outwards from the outer surface of the cylindrical body portion 5c to the extent that the outer surface thereof lies in alignment with the outer edges of the two rear triangular fins 50a as well as of the rear reinforcing rib 51. This insures that the outer-surface of the second tension piece 8 is bendable and displaceable outwards directly from a plane of both rear fins 50a and rib 51.

Preferably, the afore-stated inwardly protrudent portions 7c and 8c may each be formed to have a substantially semi-circular cross-section, thus defining a round outer surface therein. For, in that instance, the headrest stay 4, when inserted in the headrest holder 5, can be smoothly passed through the through-hole 6 of the holder, because the end of the stay 4 will smoothly ride over such round two inwardly protrudent portions 7c and 8c, and further a coefficient of friction is reduced at contact points between the outer surface of the stay 4 and those two protrudent portions 7c and 8c. This is however not imitative, but for instance, each inwardly protrudent portion (7c or 8c) may be so formed to extend at a right angle continuously from the lower end of the corresponding tension piece (7 or 8) so as to project horizontally into the inside of the cylindrical body portion 5c. Or, in place of the inwardly protrudent portion, one or more screws each having a round head may be fixed integrally to the lower end region of the tension piece so that the round heads of the screws project inwardly into the inside of the cylindrical body portion 5c.

Next, a description will be made of the process for mounting the headrest 3 to the top of the seat back SB, using the above-described headrest holder 5. In the illustrative embodiment, the headrest 3 has a pair of headrest stays 4 and 4, and therefore a pair of the headrest holders 5 and 5 are supposed to be used for such two headrest stays 4, respectively. But, hereinafter, for the sake of simplicity, a specific description will be made as to one headrest stay 4 and one headrest holder 5. Although not shown, it is to be understood that, in FIGS. 5 to 8, the support bracket 2 is of course fixed to the front surface of the upper cross frame 1a of the seat back frame 1 in the same manner as shown in FIG. 1, and therefore the first and second tension pieces 7 and 8 of the headrest holder 5 secured in the support bracket 2 face forwardly and rearwardly of the seat back SB, respectively, as far as the illustrated embodiment is concerned.

Figure 5:
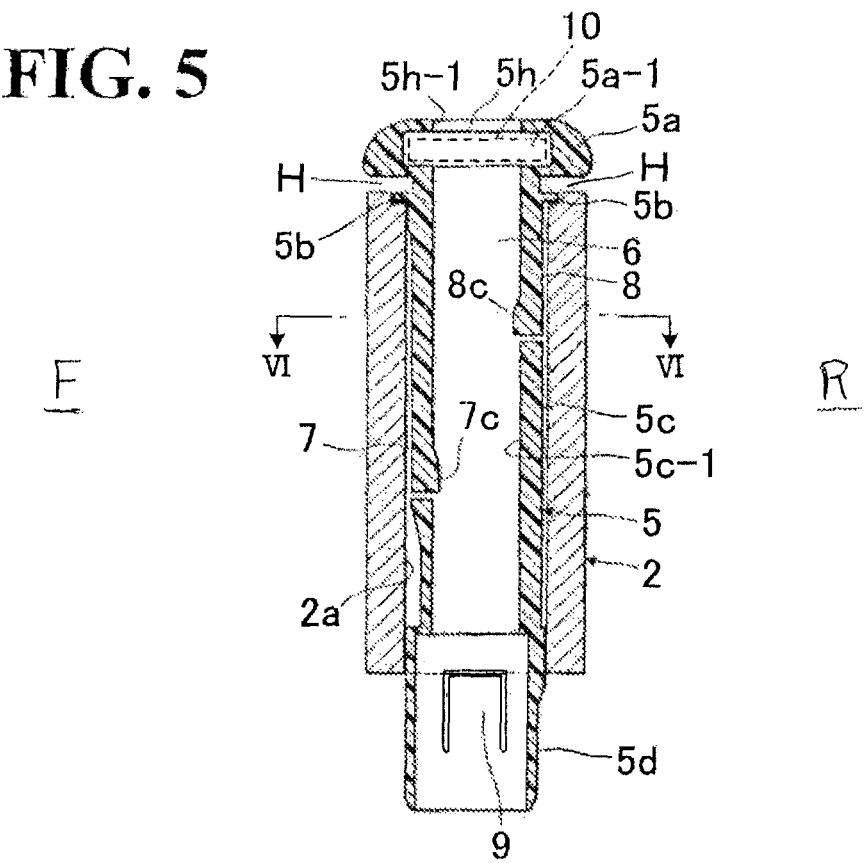
FIG. 5 is a longitudinal sectional view showing a state where the headrest holder is securely inserted in a support bracket.
Figure 6:
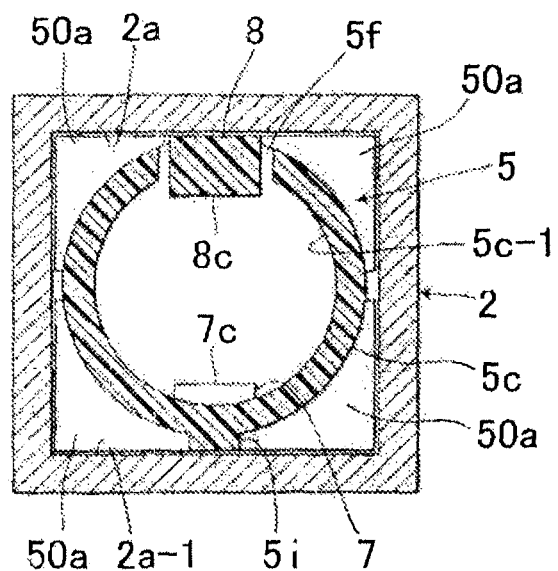
FIG. 6 is a cross-sectional view taken along the line VI-VI in the FIG. 5.

At first, when the headrest holder 5 is inserted into the support bracket 2, the lower rectangular end portion 5d as well as all the rectangular edges provided by the aforementioned fins 50a to 50d formed in the cylindrical body portion 5 are snugly, slidingly inserted in and along the rectangular hole 2a of the support bracket 2. Then, as shown in FIG. 5, the rectangular stopper flange portion 5b of the holder 5 is received in the stepped region formed in the upper end of the support bracket 2, while both two lock pieces 9 and 9 resiliently projects outwardly to engage the lower end of the support bracket 2, so that the headrest holder 5 is locked or securely retained in the support bracket 2 against removal therethrough. Further, the headrest holder 5 is prevented against dislocation transversely of the bracket 2 since all the outer rectangular edges of the fins 50a to 50d snugly contact the rectangular inner surface 2a-1 of the bracket 2. In that way, the headrest holder 5 is retained in position upon seat back frame 1 or upon the top of the seat back SB against vertical and horizontal dislocation.

Designation H denotes a circular clearance defined between the stopper flange portion 5b and the bottom side of the head portion 5a. Though not shown, the circular-clearance H is adapted for allowing insertion therein of a circular edge of a headrest hole formed in a trim cover assembly of the seat back SB.

Figure 7:
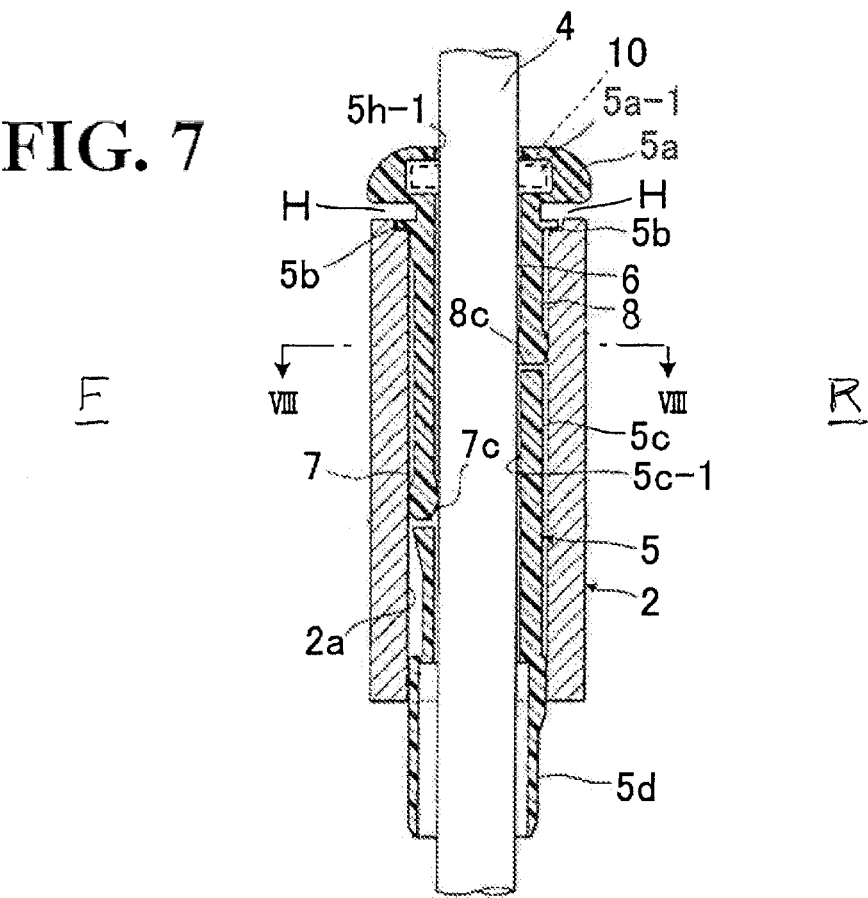
FIG. 7 is a longitudinal sectional view showing a state where the headrest holder is securely retained in the support bracket, while a stay of the headrest is also securely retained in the headrest holder.
Figure 8:
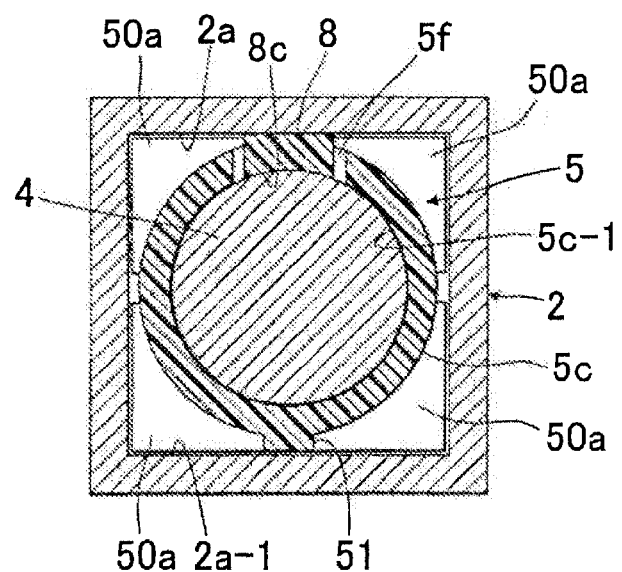
FIG. 8 is a cross-sectional view taken along the line VIII-VIII in the FIG. 5.

Subsequently, as shown in FIG. 7, the headrest stay 4 is inserted in the through-bore 6 of the headrest holder 5 thus mounted in the support bracket 2. At that moment, as best understandable from FIGS. 7 and 8, the outer surface of the headrest stay 4 contacts and presses on both two inwardly protrudent portions 7c and 8c respectively of the first and second tension pieces 7 and 8, with the result that all the two tension pieces 7 and 8 are caused to resiliently bend outwardly of the headrest holders cylindrical body, portion 5c in a direction opposite to each other. Thus, the outer surfaces respectively of the first and second tension pieces 7 and 8 are forcibly pressed against the inner surface 2a-1 of the support bracket's hole 2a, while at the same time the two inwardly protrudent portions 7c and 8c respectively of the tension pieces 7 and 8 are forcibly pressed against the outer surface of the headrest stay 4. Accordingly, both two tension pieces 7 and 8 are closely contacted not only with the outer surface of the headrest stay 4, but also with the inner surface 2a-1 of the support bracket 2, whereby a close contact of the headrest holder 5 with both headrest stay 4 and support bracket 2 is established at an upper rear point corresponding to the second tension piece 8 and at a lower front point corresponding to the first tension piece 7.

From the description above, it is to be appreciated that the following effects and advantages are attained:

(a) Even when a slight clearance is created between the headrest stay 4 and the inner surface 5c-1 of the headrest holder's cylindrical body portion 5c, the two tension pieces 7 and 8 are at the respective protrudent portions 7c and 8c thereof in close contact with the outer surface of the headrest stay 4, whereupon the two tension pieces 7 and 8 absorb or bridge such slight clearance at two vertically spaced-apart points, thereby basically preventing the headrest stay 4 against wobbling in the headrest holder's body portion 5c in any of directions vertically and transversely of the seat back SB. In addition thereto, it is important to note that the two vertically-spaced-apart and opposingly-faced tension pieces 7 and 8 also act to apply two repulsive pressing forces to the upper and lower areas of the headrest stay 4, respectively, in a direction toward each other, which in effect causes rotation of that headrest stay 4 relative to a middle point between the two tension pieces 7 and 8, so that an upper area of the headrest say 4 above the second tension piece 8 is biased to close contact with the edge 5h-1 of the hole 5h formed in the top of the head portion 5a. In other word, as viewed from FIG. 7, the headrest stay 4 is biasingly caused to rotate anticlockwise relative to a middle point between the first and second tension pieces 7 and 8, whereupon the upper area of the headrest stay 4 above the second tension piece 8 is biased to a side forwardly of the headrest holder's body portion 5c and therefore kept in close contact with a forwardly facing edge of the hole 5h of the headrest holder's head portion 5a (i.e. at the point indicated by 5h-1 in FIG. 7). Hence, it is to be appreciated that, within the headrest holder 5, the headrest stay 4 is positively supported at the following three distantly spaced-apart points: the first tension piece 7 (a lower support point), the second tension piece 8 (an intermediate point) and the head portion 5a (an upper support point). Such three-point supportive arrangement insures to retain the headrest stay 4 immovable relative to the headrest holder 5, hence completely preventing wobbling and rattling of the headrest stay 4 therein.

In this connection, as indicated in FIG. 7, in the case where the headrest stay 4 is locked by the previously mentioned lock device 10 in the head portion 5a of the headrest holder 5, it is to be understood that the lock device 10 will serve as the upper support point to the headrest stay 4, instead of the head portion 5a (or strictly stated, the edge 5h-1 of the hole 5h of that head portion 5a).

(b) Also, suppose that a slight clearance is created between the outer edges of the fins 50a to 50d of the headrest holder 5 and the inner surface 2a-1 of the support bracket 2. In that instance, upon insertion of the headrest stay 2 in the headrest holder 5 secured in the support bracket 2, both two inwardly protrudent portions 7c and 8c respectively of the first and second tension pieces 7 and 8 are contacted with the headrest stay 2, whereby both two outer surfaces respectively of those two tension pieces 7 and 8 (or the respective two free end regions 7b and 8b thereof) are brought outwardly to close contact with the inner surface 2a-1 of the support bracket 2. Thus, both two tension pieces 7 and 8 absorb or bridge the afore-said slight clearance between the fins 50a to 50d and the support bracket's inner surface 2a-1 at two vertically spaced-apart points, so that the headrest holder 5 is basically prevented against wobbling in the support bracket 2 in any of directions vertically and transversely of the seat back SB. Further, at that moment, the two first and second pieces 7 and 8 are forcibly, resiliently bent outwardly away from each other, and therefore, on the contrary, a counter repulsive force is naturally caused in the first tension piece 7 and exerted intensively on the base region 7a thereof in a direction inwardly of the cylindrical body portion 5c. At the same time, likewise, a counter repulsive force is naturally caused in the second tension piece 8 and exerted intensively on the base region 8a thereof in a direction inwardly of the cylindrical body portion 5c. Consequently, such two counter repulsive forces are directed toward each other or toward an axial center of the body portion 5c, and therefore exerted upon the lower and upper areas of the headrest holder 5, respectively, in a direction toward each other. This in effect biasingly causes rotation of the headrest holder 5 per se relative to substantially a middle point between the two tension pieces 7 and 8 thereof, within the support bracket 2, so that the stopper flange portion 5b of the headrest holder 5 is biased to close contact with one side of the upper end region of the support bracket 2. In other words, as viewed from FIG. 7, the headrest holder 5 is biasingly caused to rotate anticlockwise relative to substantially a middle point between the first and second tension pieces 7, whereupon the stopper flange portion 5b of the headrest holder 5 is biased to a side forwardly of the support bracket 2 and therefore kept in close contact with the forwardly facing upper end region of the support bracket 2 (or strictly stated, a forwardly facing wall of the stepped or recessed region of the support bracket 2 in which the stopper flange portion 5b is received, as can be seen in FIG. 7). Accordingly, it is to be appreciated that, within the support bracket 2, substantially a whole of the headrest holder's cylindrical body portion 5c is positively supported at the following three distantly spaced-apart points: the first tension piece 7 (a lower support point), the second tension piece 8 (an intermediate support point), and the upper end region of the support bracket 2 (an upper support point). Such three-point supportive arrangement insures to retain the headrest holder 5 per se immovable relative to the support bracket 2, hence completely preventing wobbling and rattling of the headrest holder 5 therein.

In this context, a distance between the first and second tension pieces 7 and 8 should importantly be given enough to cause the above-discussed rotations of both headrest stay 4 and support bracket 2, so that the upper area of the headrest stay 4 is biased to close contact with the hole 5h of the headrest holder's head portion 5a, while the neck portion or stopper flange portion 5b of the headrest holder 5 biased to close contact with the upper end region of the support bracket 2, as described above. If the distance between the two tension pieces 7 and 8 is too small and insufficient like the JP 11-89665 A, such biased contact effects or the above-discussed three-point supportive effects are not attained actually for both headrest stay 4 and support bracket 2. In other words, in that case, the two tension pieces 7 and 8 only provide one support point to the headrest stay 4 within the headrest holder 5 as well as to the headrest holder 5 itself within the support bracket 2. Hence, the above-discussed three support points are not established, with the result that both headrest stay 4 and headrest holder 5 are rotatable relative to the two tension pieces 7 and 8 as one center of rotation thereof and therefore easily subjected to wobbling and rattling.

(c) From the above items (a) and (b), it is to be appreciated that both headrest stay 4 and headrest holder 5 are retained against wobbling at only three points in the top portion of the seat back SB. Therefore, a quite simplified and highly efficient structure of headrest holder is realized for assuring prevention of wobbling and rattling of both headrest stay and headrest holder itself.

(d) Further, both two tension pieces 7 and 8 themselves are extremely simplified in structure as opposed to the tension pieces disclosed in the Japanese prior art (JP 11-89665 A). Therefore, a whole of the headrest holder 5, including such two tension pieces 7 and 8, can be easily designed and formed in one piece by molding or the like, at a reduced cost.

In the shown embodiment, the first and second tension pieces 7 and 8 are defined in the front and rear sides of the cylindrical body portion 5c, respectively, to face forwardly and rearwardly of the seat back SB. This formation is effective in absorbing and reducing forward and rearward great impacts of load which may be applied to the headrest holder 5. But, instead thereof, the two tension pieces 7 and 8 may be defined in the left and right sides of the cylindrical body portion 5c, respectively, so as to face laterally of the seat back SB.

Figure 9:
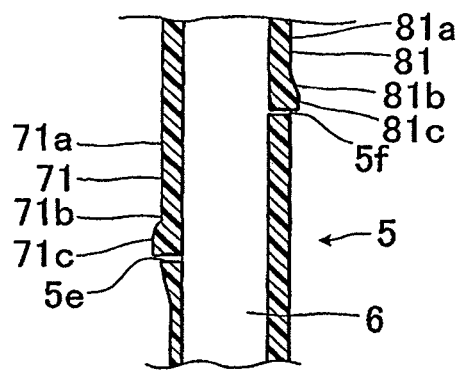
FIG. 9 is a fragmentary sectional view showing a second alternative mode of principal part of the present invention.

FIG. 9 illustrates a second alternative mode, using the above-described headrest holder 5, wherein there are shown another first and second tension pieces 71 and 81 which are basically identical in configuration to the above-described first and second tension pieces 7 and 8, respectively. Both two tension pieces 71 and 81 are formed integrally in the cylindrical body portion 5c of headrest holder 5 in the same manner as described in the first mode. Also, similar to the first mode, a substantially U-shaped slit 5e is defined so as to extend along the contour of the first tension piece 71, whereas a substantially U-shaped slit 5f defined so as to extend along the contour of the second tension piece 81. According to, the present second mode, in contrast to the first mode, the tension piece 71 has an outwardly protrudent portion 71c formed integrally in the outer surface of the free end region 71b thereof, and likewise, the second tension piece 81 has an outwardly protrudent portion 81c formed integrally in the outer surface of the free end region 81b thereof. Designations 71a and 81a denote a base region of the first tension piece 71 and a base region of the tension piece 81, respectively, which are respectively similar in structure and effect to the two base regions 7a and 8a stated in the first mode. In the present second mode, it is to be appreciated that all the inner surfaces of the first and second tension pieces 71 and 81, which face inwardly of the cylindrical body portion 5c, extend in registry with the inner surface 5c-1 of that body portion 5c, thereby advantageously allowing smooth insertion and passage of the headrest stay 4 in the through-hole 6. Namely, while not shown, when the headrest holder 5 is inserted in the support bracket 2, both two inwardly, protrudent portions 71c and 81c are pressed by and contacted with the inner surface 2a-1 of the support bracket 2. At this moment, both inner surfaces of the first and second tension pieces 71 and 81 are bent inwardly of the headrest holder's cylindrical body portion 5c, but provide a pair of gently sloped inner surfaces extending continuously from the inner surface 5c-1 of that body portion 5c, wherein such pair of gently sloped inner surfaces face towards the head portion 5a. Therefore, the headrest stay 4, when inserted into the hole 5h of that head portion 5a, can be passed smoothly between those two gently sloped inner surfaces of the first and second tension pieces 71 and 81, Of course, the two tension pieces 71 and 81 as well as the two outwardly protrudent portions 71c and 81c achieve the same action and effects as described previously in the foregoing first mode, because a difference between the first and second modes resides only in the opposed disposition of each protrudent portion with respect to the tension piece. Any person skilled in the art can readily understand that all the same actions and effects as in the first mode are also attainable in the present second mode by reading a whole of the preceding descriptions, and any further specific description in this regard is omitted for the sake of simplicity.

Figure 10:
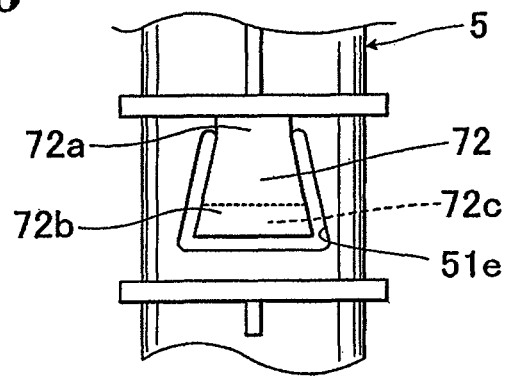
FIG. 10 is a fragmentary front view showing a third alternative mode of principal part of the invention.

FIG. 10 illustrates a third alternative mode, according to which, a substantially trapezoidal shape of first tension piece 72 may be formed in the front side of the headrest holder 5, likewise as in the first tension piece 7 of the first mode, with a substantially trapezoidal slit 51e defined so as to extend along such contour of the first tension piece 72. Also, likewise as in the first mode, the tension piece 72 has an inwardly protrudent portion 72c integrally formed in the inner surface of the free end region 72b thereof. Of course, while not shown, as similar to the second tension piece 8 of the first mode, another substantially trapezoidal second tension piece may be formed in the upper rear side of the headrest holder 5, with a substantially trapezoidal slit extending along the contour of such second tension piece of the present third mode.

Figure 11:
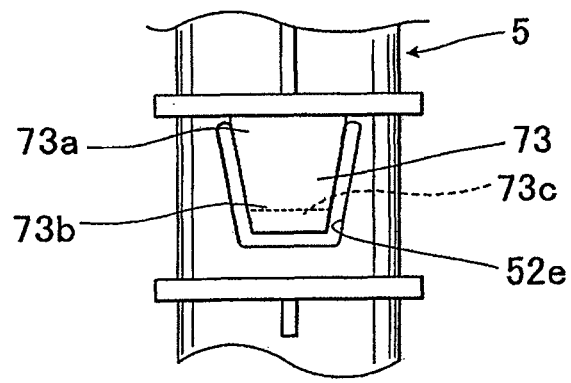
FIG. 11 is a fragmentary front view showing a fourth alternative mode of principal part of the invention.

FIG. 11 illustrates a fourth alternative mode wherein, in contrast to the third mode, a substantially inverted trapezoidal shape of first tension piece 73 may be formed in the front side of the headrest holder 5, likewise as in the first tension piece 7 of the first mode, with a substantially trapezoidal slit 51e defined so as to extend along such contour of the first tension piece 73. Also, likewise as in the first mode, the tension piece 73 has an inwardly protrudent portion 73c integrally formed in the inner surface of the free end region 73b thereof. While not shown, as similar to the second tension piece 8 of the first mode, another substantially inverted trapezoidal second tension piece may be formed in the upper rear side of the headrest holder 5, with a substantially inverted trapezoidal slit extending along the contour of such second tension piece of the present fourth mode.

In both of the foregoing third and fourth modes, all the first tension pieces 72 and 73 basically provide the same actions and effects as described previously for the first tension piece 71 of the first mode, and in addition thereto, the following advantages are attained:

(i) According to the third mode shown in FIG. 10, the base region 71a of the substantially trapezoidal first tension piece 71 is smaller in width than the free end region 71b thereof, which renders the first tension piece 71 itself prone to resilient bending relative to such base region 71a, thereby being more easily bendable than the first tension piece 7 of the first mode. Therefore, as compared with the first mode, a decreased amount of pressure is to be applied form the tension piece to the outer surface of the headrest stay 4, when inserting the headrest stay 4 in the headrest holder 5.

(ii) According to the fourth mode shown in FIG. 11, the base region 72a of the substantially inverted trapezoidal first tension piece 72 is greater in width than the free end region 72b thereof, which reduces of a degree of resilient bendability of that tension piece 72 relative to the base region 72a thereof. Hence, as compared with the first tension piece 7 of the first mode, the first tension piece 72 of the present mode is hardly bendable, so that an increased amount of pressure may be applied therefrom to the outer surface of the headrest stay 4 when inserting the headrest stay 4 in the headrest holder 5.

It is noted here that all the above-described second, third and fourth modes are compassed within the scopes of the present invention and may be adopted as required in any appropriate manner for a particular design purpose or for some technical adjustments to provide an optimum prevention of the above-stated wobbling, depending on each headrest stay used or each support bracket used, which may slightly differ in diameter and dimensions from the illustrative headrest stay 4 or headrest holder 5. For example, if a headrest stay used is of an outer diameter very dose to the inner diameter of the through-bore 6 of headrest holder 5, the substantially trapezoidal tension piece (as at 72) may be defined in the holder 5 to reduce pressure and friction caused between the headrest stay and the tension piece.

While having described the present invention thus far, it is to be understood that the invention is not limited to the illustrated embodiment, but any modification, addition and replacement may be applied thereto, without departing from the scopes of the appended claims. For example, the support bracket 2 may be formed in substantially a cylindrical configuration having a hole of substantially circular cross-section defined therein, in which case, each of the afore-said fins 50a to 50d may be formed substantially arcuate. Or alternatively, all such fins may not be formed in the headrest holder 5, while the support bracket 2 be formed in a cylindrical shape. In that case, the outer diameter of the cylindrical body portion 5c of the headrest holder 5 should be substantially equal to the inner diameter of such cylindrical support bracket.

What is claimed is:

1. A headrest holder for supporting a stay of headrest therein, the headrest holder being configured to be received in a support bracket fixed on a seat back frame of an automobile seat back, wherein said support bracket is adapted to support said headrest holder therein, said headrest holder comprising:
a head portion having a hole defined therein;
a body portion extending continuously from said head portion;
said body portion including:
a wall defining a through-bore in the body portion; and
an end region opposite to said head portion,
wherein said through-bore is substantially equal in diameter to said hole of said head portion and communicates therewith;
said through-bore and said hole being both configured to receive said stay of the headrest to be inserted therein,
said body portion of the headrest holder being so formed as to be inserted and supported in said support bracket;

wherein said wall of the body portion has: a first surface facing toward one side of said body portion; and a second surface facing toward another side of said body portion, wherein said another side of the body portion lies opposite to said one side of the body portion;

only two tension pieces, including:

a first tension piece integrally defined in said first surface of said wall so as to be resiliently bendable outwardly and inwardly relative to said one side of the wall;

said first tension piece including a protrudent portion which projects from said first surface of said wall, wherein said first tension piece is adapted to apply a pressure to both said stay of headrest and said support bracket when said headrest holder is inserted in said support bracket, while said stay of headrest is inserted and placed in said hole of said head portion as well as in said through-bore of said body portion; and a second tension piece integrally defined in said second surface of said wall so as to be resiliently bendable outwardly and inwardly relative to said another side of the wall;

said second tension piece including, formed therein, a protrudent portion which projects from said second surface of said wall, wherein said second tension piece is adapted to apply a pressure to both said stay of headrest and said support bracket when said headrest holder is inserted said support bracket, while said stay of headrest is inserted in said hole of said head portion as well as in said through-bore of said body portion, wherein said first tension piece is situated between said head portion and said second tension piece, wherein said second tension piece is situated between said first tension piece and said end region of said body portion, and wherein said first and second tension pieces are spaced apart from each other along the longitudinal direction of said body portion.

2. The headrest holder as claimed in claim 1, wherein said headrest holder is formed in one piece from a synthetic resin material, such that said head portion, said body portion, and said first and second tension pieces are all defined integrally therewith.

3. The headrest holder as claimed in claim 1, wherein said protrudent portion of said first tension piece projects inwardly into said through-bore of said body portion, and wherein said protrudent portion of said second tension piece also projects inwardly into said through-bore.

4. The headrest holder as claimed in claim 1, wherein said protrudent portion of said first tension piece projects in a direction outwardly of said body portion, whereas said protrudent portion of said second tension piece also projects in a direction outwardly of said body portion.

5. The headrest holder as claimed in claim 1, wherein said first tension piece is formed in a substantially "U" shape so as to extend along the longitudinal direction of said body portion and have: a base region which is only integral with said wall of said body portion; a free end region opposite to said base region; and a substantially U-shaped slit extending along a contour of the thus-formed substantially U-shaped first tension piece, so that said first tension piece is bendable relative to said base region in a direction inwardly and outwardly of said wall of said body portion, and wherein said protrudent portion is defined in said free end region.

6. The headrest holder as claimed in claim 1, wherein said second tension piece is formed in a substantially "U" shape so as to extend along the longitudinal direction of said body portion and have: a base region which is only integral with said wall of said body portion; a free end region opposite to said base region; and a substantial U-shaped slit extending along a contour of the thus-formed substantially U-shaped second tension piece, so that said second tension piece is bendable relative to said base region in a direction inwardly and outwardly of said wall of said body portion, and wherein said protrudent portion is defined in said free end region.

7. The headrest holder as claimed in claim 1, wherein said first and second tension pieces are each formed in a substantially trapezoidal shape so as to extend along the longitudinal direction of said body portion and have: a base region which is only integral with said wall of said body portion; a free end region opposite to said base region; and a substantially trapezoidal slit extending along a contour of the thus-formed substantially trapezoidal tension piece, wherein said base region is smaller in width than said free end region, and wherein said protrudent portion is defined in said free end region.

8. The headrest holder as claimed in claim 1, wherein said first and second tension pieces are each formed in a substantially inverted trapezoidal shape so as to extend along the longitudinal direction of said body portion and have: a base region which is only integral with said wall of said body portion; a free end region opposite to said base region; and a substantially inverted trapezoidal slit extending along a contour of the thus-formed substantially inverted-trapezoidal tension piece, wherein said base region is greater in width than said free end region, and wherein said protrudent portion is defined in said free end region.

9. The headrest holder as claimed in claim 1, wherein the body portion extends in a direction of a longitudinal axis, and wherein said second tension piece is positioned offset from the first tension piece in a direction transverse to the longitudinal axis of the headrest.

10. The headrest holder as claimed in claim 1, wherein the first and second tension pieces apply repulsive forces causing rotation of at least one of the stay of the headrest and the headrest holder.

* * * * *